United States Patent [19]

Shaw

[11] 4,229,182
[45] Oct. 21, 1980

[54] RECOVERY OF ALUMINUM FROM COMPOSITE PROPELLANTS

[76] Inventor: Robert A. Frosch, Administrator of the National Aeronautics and Space Administration, with respect to an invention of Graham C. Shaw, Garland, Utah

[21] Appl. No.: 947,000

[22] Filed: Sep. 29, 1978

[51] Int. Cl.³ .......................... B01J 19/00; B01F 1/00
[52] U.S. Cl. ...................................... 23/293 R; 75/25; 149/108.4; 260/96 D; 252/364; 423/1; 423/131; 423/658.5; 525/384; 526/914
[58] Field of Search ............. 23/293 R, 305 R, 305 A; 423/1, 131, 685.5; 260/96 D; 525/384; 526/914; 528/496; 149/108.4; 252/364

[56] References Cited

U.S. PATENT DOCUMENTS

| 3,337,464 | 8/1967 | Sayles ........................... 149/108.4 X |
| 3,379,589 | 4/1968 | Hunter et al. ................. 149/108.4 X |
| 3,446,764 | 5/1969 | Phillips et al. .................... 252/364 X |
| 3,451,789 | 6/1969 | McIntosh ........................... 23/302 R |

*Primary Examiner*—Joseph Scovronek
*Attorney, Agent, or Firm*—Monte F. Mott; John R. Manning; Wilfred Grifka

[57] ABSTRACT

Aluminum is recovered from solid rocket propellant containing a small amount of oxidizer by depolymerizing and dissolving propellant binder containing functional or hydrolyzable groups in a solution of sodium methoxide in an alcohol solvent optionally containing an aliphatic or aromatic hydrocarbon co-solvent and then filtering the solution to recover substantially all the aluminum in active form.

9 Claims, No Drawings

RECOVERY OF ALUMINUM FROM COMPOSITE PROPELLANTS

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

BACKGROUND OF THE INVENTION

1. Field of the Invention

The present invention relates to solid propellant disposal and recovery and more particularly, to a method of recovering aluminum from the waste propellant.

2. Description of the Prior Art

There is a considerable amount of waste propellant produced during the manufacture of solid propellant rocket motors, such as from the excess cast into the motor casing to compensate for shrinkage, from motors or masterbatches that do no meet specifications, as well as overage motors removed from service. Typically this waste propellant has been scrapped since the flammability and rubbery characteristics have been believed to prevent economical reclamation.

Large quantities of waste propellant have been and are now being burned in open burning pits. Due to increasing environmental pressure, many propellant producers are either now burning waste propellant and scrubbing the combustion gases or are planning on or will be required to do so in the future.

The expected quantity of waste composite propellant from the U. S. Space Shuttle Solid Rocket Motor boosters from 1976 through 1989 is expected to be about $8 \times 10^6$ lbs. The cost of burning waste propellant is considerable. Economic recovery of propellant ingredients would save energy, cost, reduce materials and eliminate the costly, undesirable and hazardous open burning or incineration procedure.

A number of studies have been made on the recovery of aluminum from propellants as a part of a procedure in disposing of excessed propellant in a more ecologically acceptable manner than that of open pit burning. The approach of the various methods has been to depolymerize, or hydrolyze, the binder directly in the presence of all the propellant ingredients. A large number of catalysts and solvents have been tested, some of which resulted in very limited success. The results have been a partial breakdown of the binder system that allowed the recovery of only a small part of the aluminum present in an impure or contaminated state. A major portion of the aluminum was observed to remain with sufficient binder to result in a rubbery mass when dried.

Due to the expense of the reaction techniques, the exotic solvents required, and other problems encountered such as the recovery of impure materials and often the loss of much of the aluminum in the chemical reactions, the methods of propellant disposal have remained that of a burning process whereby any recovery value of oxidizer, fuel, i.e., aluminum and binder, are lost. Up to the present time, over six million dollars have been invested at Edwards AFB in a facility to burn propellants in a controlled and environmentally acceptable manner. Also, when ammonium perchlorate is present, the wet combustion process used results in a very corrosive solution, necessitating the use of titanium, tantalum-clad, or refractory-lined reactors. The effluents require neutralization, filtration, and the water soluble materials concentrated by reverse osmosis and ion exchange before the water can be disposed of or reused.

SUMMARY OF THE INVENTION

An improved process for the reclamation of propellant ingredients from waste propellant has been provided in accordance with this invention. The process is economical, conserves energy and is ecologically appealing. Though open pit burning is inexpensive, the process of the invention becomes attractive because the presence of a large amount of uniform composition waste propellant lends itself to the design and construction of a plant to recover ingredients in a volume great enough to pay out the investment. Ingredient recovery just from the Space Shuttle waste propellant is expected to be worth over $1.5 million and should conserve over 100 million kwh of energy over the term of the Space Shuttle Program.

In the method of this invention, the metal fuel powder and the resin are recovered from propellant binder containing less than 15% oxidizer salt by dissolution of the binder in an active transesterification solvent such as an alcoholic solution of an alkali metal alkoxide of the formula MOR where M is an alkali metal suitably sodium or potassium and R is an alkyl group containing 1 to 6 carbon atoms. The alcohol is an alkanol containing 1 to 6 carbon atoms. The method is applicable to propellant binders which are crosslinked or cured through the reaction of carboxyl, epoxy, imine, hydroxyl and isocyanate functional groups as well as other binders having hydrolyzable groups in the polymer chain backbone such as the PBAA, PBAN, CTPB, HTPB and polyester binder systems.

A solution of sodium methoxide in an alcohol solvent is added and heated to reflux. Generally, when hydrocarbon binders are being treated that are insoluble in the alcohol, a co-solvent is added to provide the solution of the depolymerized binder, thus allowing a more rapid attack of the depolymerization catalyst upon the binder. Such solvents as toluene, benzene or a hydrocarbon as hexane is useful for dissolving the hydrocarbon type depolymerized binder. The presence of the small amount of residual ammonium perchlorate remaining in the binder-aluminum residue did not prevent the transesterification reaction which resulted in polymer chain scission or depolymerization. However, the quantities of oxidizer normally present in the propellant composition did interfere and prevent the transesterification from occurring. This method is also applicable to pyrotechnic compositions containing polyester binders using alkali or alkaline earth nitrates as the oxidizer without prior removal of the oxidizer.

The low oxidizer aluminum-binder residue is obtained by an aqueous leach of the scrap propellant as disclosed in U.S. Pat. No. 3,451,789 to Meldon McIntosh or in copending patent application Ser. No. 946,990 filed Sept. 29, 1979 by Graham C. Shaw and Meldon J. McIntosh entitled PROCESS FOR THE LEACHING OF AP FROM PROPELLANT filed concurrently herewith, the disclosures of which are expressly incorporated herein by reference. In the above-referenced patent application, the scrap propellant is shredded in a waterflooded shredder and then leached in warm aqueous media containing 0.01 to 0.1% of a surfactant such as an alkyl ethylene oxide phosphate at 130° F. to 200°

F. followed by filtration to separate the binder-aluminum residue.

In the transesterification method of this invention the binder is removed chemically, depolymerized, filtered and washed from the aluminum residue. The method uses a solvent with an alcoholic solution of sodium methoxide to transesterify the crosslinked sites of the binder system. When moisture is excluded from the system (less than 5% by weight), the highly basic alkyl oxide radical has little effect upon the Al present, but reacts very rapidly with the binder. Mixed solvents of either methanol and tetrahydrofuran or toluene were effective in the transesterification reactions.

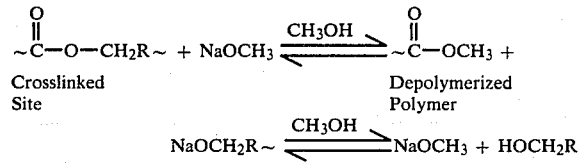

Crosslinked Site → Depolymerized Polymer $$NaOCH_2R\sim \; \underset{CH_3OH}{\rightleftharpoons} \; NaOCH_3 + HOCH_2R$$

The products of the reaction were soluble in toluene. Washing the binder from the Al generally resulted in the recovery of 98.7 to 99.7% of the theoretical amounts. Analysis for active aluminum content ranged from 98.5 to 99%, which was well above the minimum specification level of 98% for propellant usage. The recovery of the aluminum powder was essentially quantitative, indicating that this procedure is superior to other methods tried, or found in the literature.

These and many other features and attendant advantages of the invention will become apparent as the invention becomes better understood by reference to the following detailed description.

DESCRIPTION OF THE PREFERRED EMBODIMENTS

Most solid propellants comprise an elastomeric hydrocarbon binder containing from about 75 to 89% of solid consisting of oxidizer and particulate metal such as aluminum or zirconium interspersed in the binder. The oxidizer is generally present in an amount from 55–85% by weight and the metal powder from 5 to 30% by weight of the propellant. One of the most commonly used metal fuels is aluminum (Al) and the specific embodiments are directed to this material.

The binder component of the propellant includes an elastomeric hydrocarbon, curing ingredients and plasticizer. Preferred binders for solid rocket propellants are elastomeric hydrocarbon polymers formed by the chain extension and crosslinking reactions of functionally terminated liquid polybutadiene polymers. Such polymers may include carboxyterminated polybutadiene (CTPB) cured with amines or epoxides, polybutadiene acrylonitrile-acrylic terpolymers (PBAN) cured with epoxides and hydroxy-terminated polybutadiene (HTPB) cured with diisocyanates. PBAN polymers are being utilized as the binder for the propellant for the Space Shuttle.

The binder composition may also contain a minor amount below 10% of various additives such as cure promoters, stabilizers, burning rate accelerators, thixotropic control agents, or reactive polymeric modifiers such as one or more diols or polyols. The isocyanate is generally present in at least an equivalent amount sufficient to react with the hydroxy prepolymer and hydroxyl substituted modifiers.

The current Space Shuttle Baseline Propellant has the following approximate composition:

TABLE 1

| Ingredient | % by weight |
|---|---|
| Solids | 86.00 |
| AP | 69.60 |
| Al | 16.00 |
| Fe$_2$O$_3$ | 0.40 |
| PBAN* | 14.00 |

*cured with an epoxy (DER-331)

In the process of this invention the binder-metal residue from aqueous extraction containing a low level of oxidizer salt is placed in a reaction vessel and catalyst-solvent added. The amount of solvent is at least the amount necessary for solution of the residue, generally the ratio of solvent to residue being at least 3/1 typically from 5/1 to 20/1 by weight. The amount of catalyst depends somewhat on the nature of the polymer and number and type of functional groups to be transesterified but is usually at least 5% by weight based on weight of residue, typically from 10% to 100%. The transesterification reaction proceeds at faster rate at higher temperature. The solution is usually heated to a temperature of at least 50° C., generally at reflux at a temperature from 72° C. to 110° C.

An example of the polymer depolymerization by the transesterification of a PBAN propellant residue (Minuteman TP-H1001) follows: The propellent residue obtained from the AP leaching operation was placed in a reaction vessel with 10 grams of sodium methoxide dissolved in 100 ml of methanol along with 200 ml of an additional solvent such as tetrahydrofuran, benzene, or toluene. The mixture was heated to refluxing for 1–2 hours and then diluted with additional solvent (200–1000 ml) to reduce the viscosity of the reactants to the point where the aluminum was readily removed by filtration. Washing the aluminum with small portions of hydrocarbon solvent such as benzene or toluene resulted in the recovery of aluminum in yields of 98% or greater. Typical chemical analysis of the aluminum recovered indicated a 98.5 to 99.5 active aluminum content. Examples of the recovery reaction are given in Table II.

TABLE II

TRANSESTERIFICATION REACTIONS ON TP-H1011 BINDER-ALUMINUM RESIDUES

| | Test No. | | | | | | |
|---|---|---|---|---|---|---|---|
| | 1 | 2 | 3 | 4 | 5 | 6 | 7 |
| Residue Amount (gm) | 10 | 20 | 20 | 20 | 20 | 20 | 20 |
| Al Content (%) | 52.16 | 52.16 | 46.1 | 52.16 | 52.16 | 52.16 | 49.49 |
| AP Content (%) | 2.2 | 2.2 | 13.5 | 2.2 | 2.2 | 2.2 | 7.2 |
| Catalyst Amount (%) | 10 | 10 | 10 | 10 | 2 | 10 | 10 |
| Solvents: | | | | | | | |
| Methyl Alcohol (ml) | 40 | 80 | 80 | 120 | 80 | 26 | 18 |
| Tetrahydrofuran (ml) | 60 | 120 | 120 | 47 | 120 | — | — |
| Toluene (ml) | — | — | — | — | — | — | 180 |
| Reaction Time (hr) | 0.83 | 0.83 | 0.75 | 1.0 | 1.0 | 1.0 | 1.5 |
| Aluminum Recovery (% of theoretical) | 94 | 101 | 119* | 99.7 | 98.7 | 98.7 | 102* |
| Active Al Content (%) | 98.6 | 98.9 | 98.5 | 97.8 | 98.6 | 99.0 | 93.7 |
| Ignition 1 Hr at 500° C. Weight Loss (%) | 0.0 | 0.0 | 0.4 | 0.23 | 0.02 | 0.0 | 2.05 |
| Active Al | | | | | | | |

TABLE II-continued

TRANSESTERIFICATION REACTIONS ON TP-H1011 BINDER-ALUMINUM RESIDUES

| | Test No. | | | | | | |
|---|---|---|---|---|---|---|---|
| | 1 | 2 | 3 | 4 | 5 | 6 | 7 |
| Content of Ignited Material (%) | 98.8 | 98.4 | 97.6 | 98.0 | 98.5 | 93.3 | 96.4 |

*The residue appeared to contain some NaClO$_4$ or NH$_4$ClO$_4$ resulting from the NH$_4$ClO$_4$ which was in the binder residue and the catalyst.

Tetrahydrofuran was initially used as co-solvent, since it would dissolve both the depolymerized products and the sodium methoxide and methyl alcohol used in the reaction. It was found that the tetrahydrofuran was unnecessary. In run No. 6 the methyl alcohol-sodium methoxide solution in contact with the binder, heated to reflux (60° C.) was sufficient for the reaction to proceed. After 1 hour reaction time the organic portion of the reaction residue was soluble in toluene. Filtering and washing the residue with toluene resulted in a free flowing Al powder when dried. The use of toluene in reaction run No. 7 decreased the reaction rate to the point that some polymerized binder remained after 1.5 hrs reaction time. This decrease in the reaction rate was due to the insolubility of the sodium methoxide catalyst in the toluene, which effectively removed most of the catalyst from the reaction. This problem was not encountered in run No. 6, since the toluene was not added until the reaction was completed. Runs 3 and 7 show that the depolymerization does proceed in the presence of moderate amounts of ammonium perchlorate.

The binder portion of the residue was recovered from the transesterification reactions by diluting the liquid residue in chloroform, neutralizing the residues with hydrochloric acid, and washing with water. Evaporation of the solvent resulted in a liquid resembling the starting premix used to make the propellant.

Infrared scans of the recovered binder and a control sample of the premix containing uncured PBAN prepolymers and the epoxy curing agent indicate that the two samples are very similar. The major differences were those expected; i.e., the presence of a broad band at 3,400 cm$^{-1}$ in the recovered sample indicates the presence of hydroxy groups which would result from the hydrolyzed epoxide, and a strong ester band at 1,730 cm$^{-1}$ resulting from the methyl ester produced by the transesterification reaction. A shoulder at 1,705 cm$^{-1}$ shows the presence of a small amount of free carboxylic acid groups. The presence of the carboxyl group was also verified by the acid number determination which was 0.028 eq/100 g. A typical acid number for cured TP-H1011 propellant is 0.015 eq/100 g, while that of the uncured premix control was 0.051 eq/100 g. This indicates that some hydrolysis to the free carboxylic acid group has occurred during the depolymerization and recovery process, but most of the polymer functional groups remained as the methyl ester.

The propellant binder recovered was depolymerized to a molecular weight slightly higher than the prepolymers originally used, although much of it was in the form of a methyl ester. Gel permeation chromatography of the residue gave a number average molecular weight of 3,160 compared to 2,910 for the control, which was a sample of the unreacted PBAN prepolymer used in formulating the TP-H1011 propellant. The molecular weight distribution of the binder residue was also found to be very similar to the unreacted prepolymer. The number average molecular weight of 9,110 compared to 6,610 for the control indicates that the depolymerization was not quite complete; however, continued processing to obtain the free carboxylic acid groups in the binder would also complete the depolymerization of the binder. The recovered binder residue would be suitable for disposing of by several methods ranging from landfill, to use by rubber formulators. At this point, however, its recovery as a reusable PBAN prepolymer could be accomplished using straightforward and established procedures to regenerate the carboxyl functional groups in the prepolymer. The purification of the prepolymer and its removal from the epoxy curing agent residue could also be accomplished by several possible methods, such as use of ion exchange columns of liquid chromatography, which are inexpensive and effective processes.

The recovered epoxy residue could also be regenerated into a reactive epoxy compound, although the chemical procedures used would be more extensive than those used for the recovery of the aluminum, AP, or polybutadiene prepolymers from the propellant. The epoxy residue would also be available as a chemical intermediate for other materials or regeneration by the vendor.

Propellants containing polyurethane binders were also depolymerized using the methyl alcohol and toluene or tetrahydrofuran mixed solvents with sodium methoxide catalyst. However, due to the greater stability of the urethane crosslinks, the depolymerization reaction was allowed to run over night before work up.

The polymer used in the propellant binder was recovered by giving the solution of hydrocarbon solvent and binder a water washing and then evaporating the solvent. The polymer recovered from the propellants using carboxyl functional groups was obtained as the methyl ester of the polymer which could be further hydrolyzed and purified to obtain a reusable polymer. It could also be disposed of without further hydrolysis by a number of methods which could include its use as a fuel additive to kerosene.

The techniques mentioned above provide an economical and environmentally acceptable method of disposing composite propellants. The aluminum and the binder can be reprocessed into marketable forms.

It is to be understood that only preferred embodiments of the invention have been described and that numerous substitutions, modifications and alterations are permissible without departing from the spirit and scope of the invention as defined in the following claims.

What is claimed is:

1. A method of recovering metal powder from a solid composite propellant comprising a synthetic polymeric binder containing hydrolyzable cured groups, and less than 15% oxidizer salt comprising the steps of:
    dissolving the composite propellant in an active transesterification solvent comprising an alcohol solution of a catalyst and the catalyst being present in an amount of at least 5% by weight based on composite propellant and is an alkali metal alkoxide of the formula MOR where M is an alkali metal and R is an alkyl group containing 1 to 6 carbon atoms whereby the binder is depolymerized into fragments soluble in the solvent; and
    separating the metal from the solution.

2. A method according to claim 1 in which the catalyst is sodium methoxide and the alcohol is methanol.

3. A method according to claim 1 in which the binder is cross-linked or cured through the reaction of hydrolyzable groups selected from carboxyl, epoxy, imine, hydroxyl, acrylonitrite or isocyanate.

4. A method according to claim 3 in which the binder is selected from PBAA, PBAN, CTPB, HTPB or polyester.

5. A method according to claim 1 in which the solution of composite propellant in solvent is heated to a temperature of at least 50° C.

6. A method according to claim 4 in which the metal powder is aluminum.

7. A method according to claim 1 in which the composite propellant is pretreated by an aqueous leach to reduce the oxidizer salt content to no more than 15% by weight.

8. A method according to claim 7 in which the pretreated composite propellant comprises a PBAN binder, aluminum powder and no more than 10% by weight of ammonium perchlorate.

9. A method according to claim 1 in which a co-solvent is added to the solution.

* * * * *